Oct. 10, 1933.   J. M. HOTHERSALL   1,929,429
CONTAINER
Filed June 25, 1930

INVENTOR
John M. Hothersall
BY
John C. Carpenter
ATTORNEY

Patented Oct. 10, 1933

1,929,429

UNITED STATES PATENT OFFICE 1,929,429

CONTAINER

John M. Hothersall, Brooklyn, N. Y., assignor to American Can Company, New York, N. Y., a corporation of New Jersey Application June 25, 1930. Serial No. 463,712

1 Claim. (Cl. 220—94)

The present invention relates to a container and has particular reference to such a container embodying an improved type of handle.

The principal object of the present invention is the provision of a container provided with an improved type of handle which is applied thereto after the container is closed.

An important object of the invention is the provision of an improved type of handle for engagement with the seam between a container and the top end closure.

An important object of the invention is the provision of an improved handle having ends which engage with the seam of a container and having parts engaging beneath the seam to support the weight of the container and its contents when carried by the handle.

An important object of the present invention is the provision of an improved type of handle having ends easily attached to the container and having abutments engaging beneath parts of the container to provide supporting surfaces therefor.

Numerous other objects of the invention will be apparent as it is better understood from the following description, which, taken in connection with the accompanying drawing, discloses a preferred embodiment thereof.

Referring to the drawing:—

Figure 1:
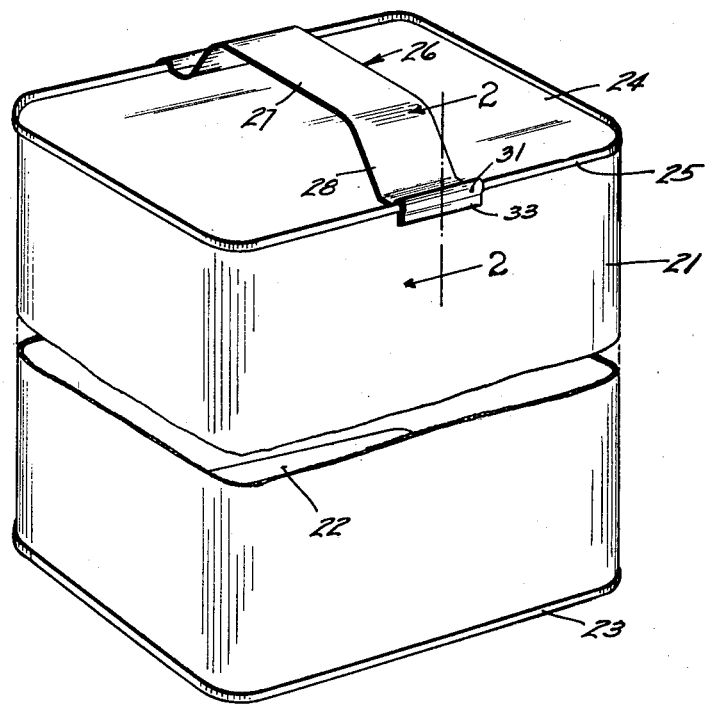
Figure 1 is a perspective view of an improved type of container of the present invention, this container embodying an improved type of handle.

The container of the present invention is preferably of rectangular form, as illustrated in the drawing, being formed of a container body 21 to which is secured a bottom 22, the line of attachment providing a seam 23. An upper end 24 is secured to the body 21 in a seam 25 which projects beyond the wall of the container body. Ordinarily the container is filled with its contents prior to seaming of its upper end 24 thereto.

Figure 2:
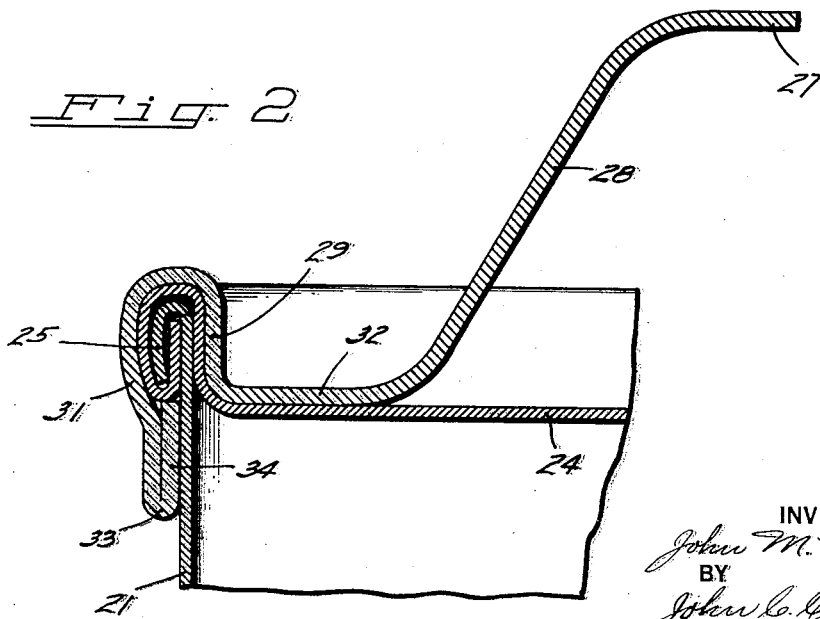
Fig. 2 is an enlarged transverse sectional view taken substantially along the line 2—2 in Fig. 1.

Seams 23 and 25 may be of the usual double seam type, the seam 25 being illustrated in cross section in Fig. 2, this form of seam projecting beyond the side wall of the body 21.

A flat metal handle 26 is provided for the purpose of carrying the container, this handle being formed with a hand grip section 27 connected by inclined portions 28 to the two ends of the handle. These handle ends are adapted to be tightly clamped over the double seam 25 on opposite sides of the container.

To provide this clamping connection, each handle end is formed with an inner vertical wall 29 and an outer wall 31 lying respectively inside and outside of the seam when tightly compressed thereon. Each inner wall 29 joins with one of the inclined portions 28 in a flat section 32 which rests upon the upper surface of the end 24.

The extremities of the handle ends extending beyond the walls 31 and below the seam 25 are folded or bent back on themselves at 33 to provide abutments 34, the extreme edges of which engage the lower surface of the projecting seam.

The interlocking engagement thus formed between the handle and seam is of sufficient strength to permit the carrying of the container when filled even with a heavy content without any distortion of the handle. The abutments 34, in taking the brunt of the load, provide a permanently rigid construction of handle container.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

The combination of a container having at its top end a seam which projects upwardly and outwardly from the container body, and a handle of flat metal having end portions bent to extend upwardly against the under side of said seam, and having portions which enclose the outer side of said seam, and having portions which extend down on the inner side of the seam, said end portions merging into a middle handle-part which connects together said end portions and is arranged at a distance from and above the top of the container.

JOHN M. HOTHERSALL.